United States Patent
Lin et al.

(10) Patent No.: US 6,718,406 B2
(45) Date of Patent: Apr. 6, 2004

(54) MEMORY ARRAY APPARATUS WITH REDUCED DATA ACCESSING TIME AND METHOD FOR THE SAME

(75) Inventors: Chuan Sheng Lin, Hsinchu (TW); Chen Nan Lai, Hsinchu (TW); Kuang Yuan Chen, Hsinchu (TW)

(73) Assignee: Key Technology Corporation, Hsinchu (TW)

( * ) Notice: Subject to any disclaimer, the term of this patent is extended or adjusted under 35 U.S.C. 154(b) by 287 days.

(21) Appl. No.: 09/919,818

(22) Filed: Aug. 2, 2001

(65) Prior Publication Data

US 2003/0028707 A1 Feb. 6, 2003

(51) Int. Cl.[7] .................................................. G06F 3/00
(52) U.S. Cl. .......................... 710/36; 710/37; 710/38; 710/58
(58) Field of Search .............................. 710/36, 58, 52, 710/62, 65, 20

(56) References Cited

U.S. PATENT DOCUMENTS

| | | | |
|---|---|---|---|
| 5,012,408 A | * | 4/1991 | Conroy |
| 5,060,145 A | * | 10/1991 | Scheuneman et al. |
| 5,263,003 A | * | 11/1993 | Cowles et al. |
| 5,987,573 A | * | 11/1999 | Hiraka |
| 6,215,727 B1 | * | 4/2001 | Parson et al. |

* cited by examiner

Primary Examiner—Jeffrey Gaffin
Assistant Examiner—Alan Chen
(74) Attorney, Agent, or Firm—Rosenberg, Klein & Lee (57) ABSTRACT

A memory array apparatus with shorter data accessing time is proposed. The memory array apparatus comprises a register administrator and a plurality of data registers between a micro controller and at least one memory array. The data to be accessed are divided into a plurality of data blocks according to a predetermined data unit. The data block is firstly stored in corresponding data register and then read by the main frame or stored into the corresponding memory array. At the same time, the next data block is stored in the corresponding data register through circuit switched by the micro controller. The pending time of the main frame and the data accessing time can be advantageously reduced.

7 Claims, 7 Drawing Sheets

MEMORY ARRAY APPARATUS WITH REDUCED DATA ACCESSING TIME AND METHOD FOR THE SAME

FIELD OF THE INVENTION

The present invention relates to a memory array apparatus, especially to a memory array apparatus with shorter data accessing time to reduce waiting of a main frame, and method for the same.

BACKGROUND OF THE INVENTION

The flash memory has the advantages of compact size, low power consumption, shock resistance and non-volatility, and is suitable for portable electronic devices such as personal communication apparatus and palm computer.

Figure 1:
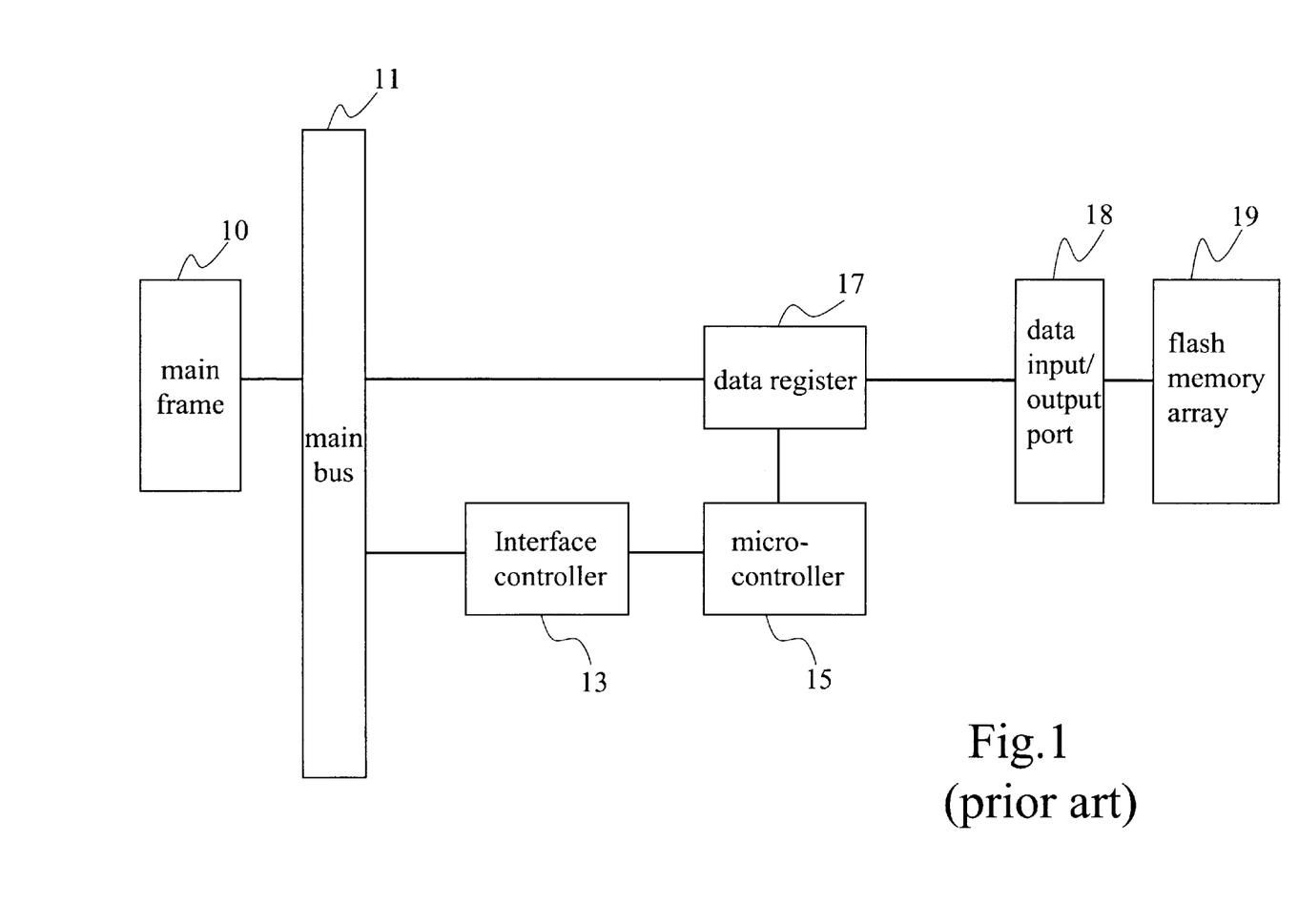
FIG. 1 shows the block diagram of a conventional flash memory array apparatus.

FIG. 1 shows a conventional flash memory array apparatus, which mainly comprises an interface controller 13, a micro-controller 15, a data register 17, a data input/output port 18 and a flash memory array 19. The interface controller 13 of the flash memory array apparatus is connected to a main frame 10 through a bus 11. When data is to be stored into the flash memory array 19, the main frame 10 commands the micro-controller 15 to divide the data to be stored into a plurality of data blocks according to a predetermined data unit such as 512 bytes. Each data block is firstly stored in the data register 17 and then stored into the flash memory array 19 through the data input/output port 18. On the contrary, the data transmission path is reversed when the data is to be read.

However, in above-mentioned flash memory array apparatus, the data transmission speed between the data register 17 and the flash memory array 19 is relatively low. Moreover, the above-mentioned flash memory array apparatus is designed to have single data register 17 and single flash memory array 19, the main frame 10 requires a waiting time before the data transmission between the data register 17 and the flash memory array 19 is completed. The data accessing speed is not satisfactory.

SUMMARY OF THE INVENTION

It is the object of the present invention to provide a memory array apparatus with shorter data accessing time to reduce waiting of a main frame, and method for the same.

In one aspect of the present invention, the data to be accessed is divided into a plurality of data blocks and a plurality of data registers are used to store temporarily the separate data block. The data accessing time between the memory array and the data register is exploited to the data transmission for the next data block, whereby the waiting time of main frame can be reduced.

The various objects and advantages of the present invention will be more readily understood from the following detailed description when read in conjunction with the appended drawing, in which:

DETAILED DESCRIPTION OF THE INVENTION

Figure 2:
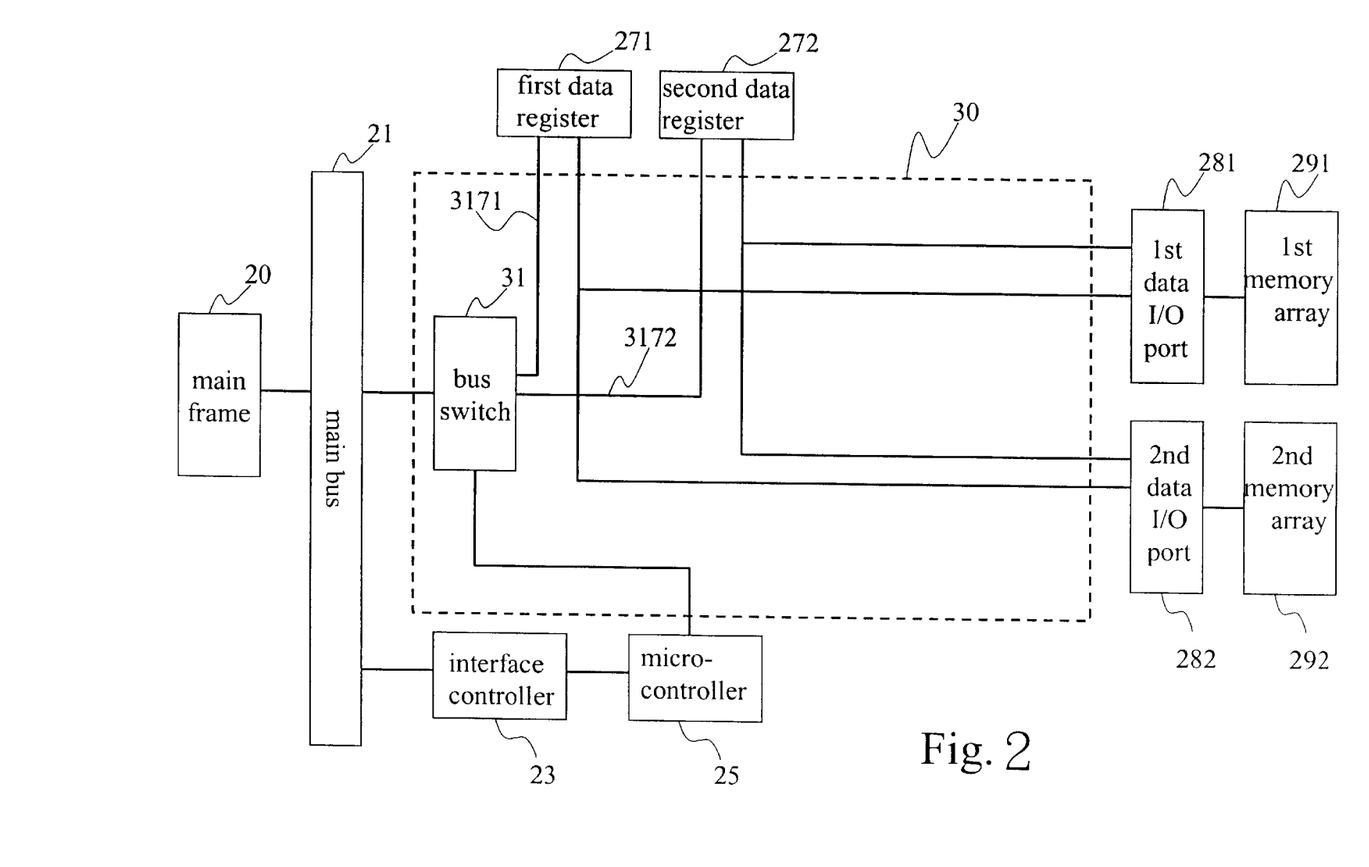
FIG. 2 shows the block diagram of a preferred embodiment of the present invention.

FIG. 2 shows a block diagram of a preferred embodiment of the present invention. The memory array apparatus of the present invention mainly comprises an interface controller 23, a micro-controller 25, a register administrator 30, a first data register 271, a second data register 272, a first data I/O port 281, a second data I/O port 282, a first memory array 291 and a second memory array 292. The interface controller 23 is connected to a main frame 20 through a main bus 21 and is also connected to the micro-controller 25. The register administrator 30 has at least one bus switch 31, which is connected to the main frame 20 through the main bus and connected to the micro-controller 25. The bus switch 31 is controlled by the micro-controller 25 to selectively communicate with one of the two data registers 271 and 272. The data I/O ports 281 and 282 are connected to the data registers 271 and 272, respectively, and corresponding memory arrays 291 and 292.

Figure 3:
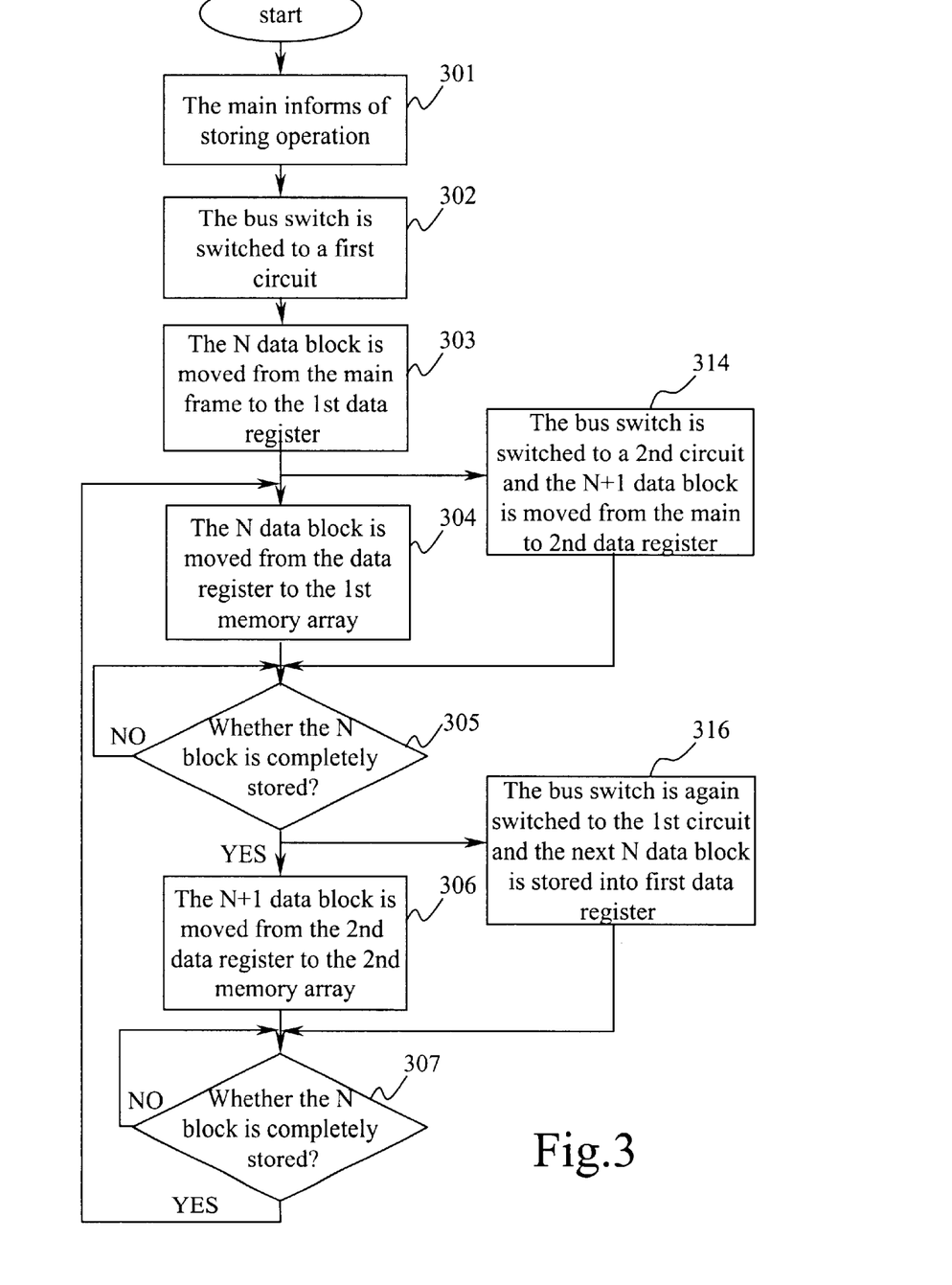
FIG. 3 shows the storing flowchart of the preferred embodiment in FIG. 2.
Figure 5:
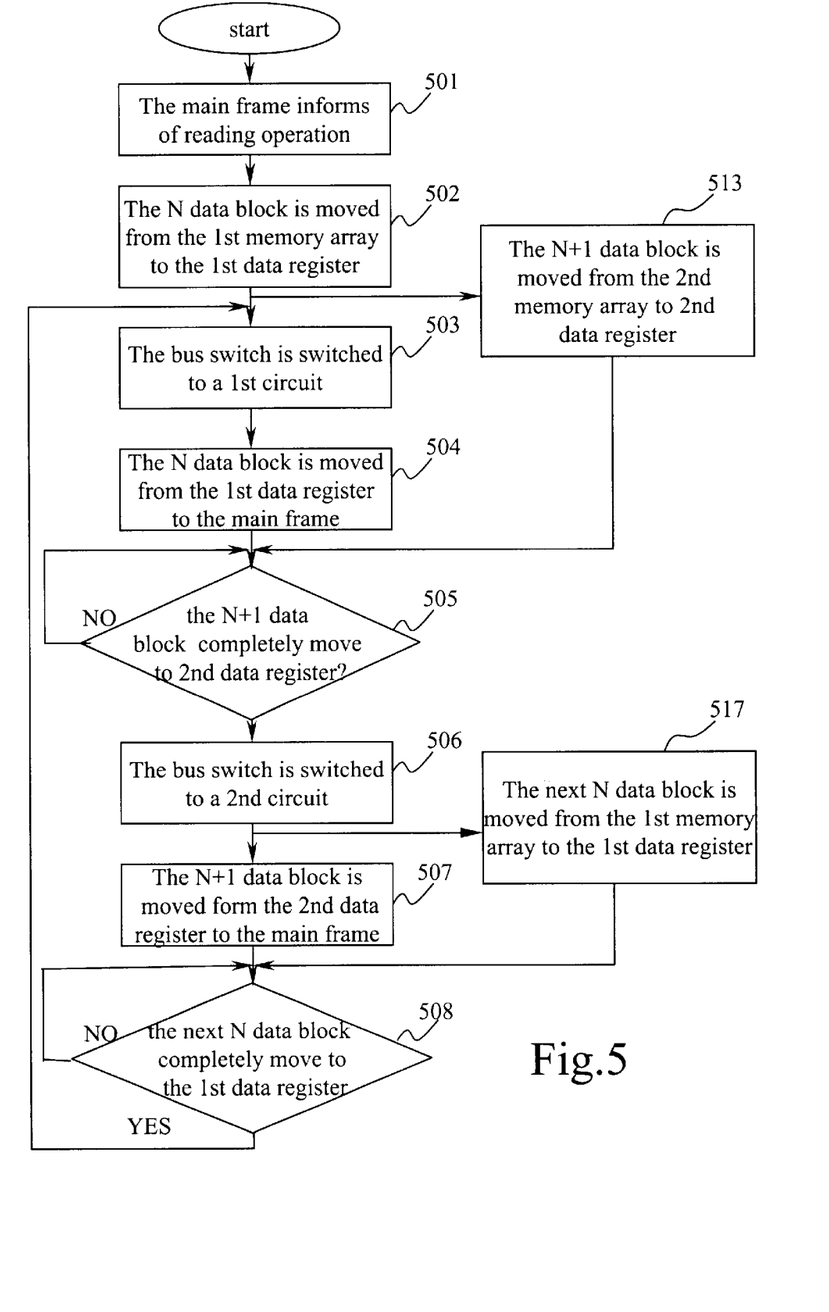
FIG. 5 shows the reading flowchart of the preferred embodiment in FIG. 2.

FIGS. 3 and 5 show the flowcharts of the present invention. The storing process for main frame 20 to store data into the memory arrays 291 and 292 comprises following steps:

Step 301: The main frame 20 informs the micro-controller 25 of storing operation through the main bus 21 and the interface controller 23.

Step 302: The bus switch 31 of the register administrator 30 is controlled by the micro-controller 25 and selectively switched to a first circuit 3171 connected with the first data register 271.

Step 303: The micro-controller 25 divides the data to be stored into a plurality of data blocks with a predetermined data unit. In the present embodiment, the data unit is in terms of logical array block (LAB); with a blocksize 512 bytes. The plurality of data blocks contains a first data block stored temporarily in the first data register 271. The first data block belongs to an N data block series. The capacity of all data registers is larger than or equal to 512 bytes. Afterward, steps 304 and 314 are simultaneously executed after the temporary storing process.

Step 304: The first data register 271 is controlled by the micro-controller 25 to store the first data block (N data block) into the memory array 291 through the first data I/O port 281. The memory is characterized by a relative long accessing time. Therefore, the micro-controller 25 executes the step 314 simultaneous with the step 304.

Step 314: The bus switch 31 of the register administrator 30 is controlled by the micro-controller 25 and selectively switched to a second circuit 3172 connected with the second data register 272. The second data block (N+1 data block) of the data blocks from the main frame 20 is stored temporarily in the second data register 272.

Step 305: Whether the data stored in the first data register 271 is completely stored in the memory array 291? If true, the steps 306 and 316 are simultaneously executed.

Step 306: Due to the relative long accessing time of the memory, the second data block (N+1 data block) of the data blocks has been stored temporarily in the second data register 272. At this time, the second data block (N+1 data block) of the data blocks stored temporarily in the second data register 272 is moved to the second memory array 292 through the second data I/O port 282.

Step 316: Simultaneously with the step 306, the bus switch 31 is controlled by the micro-controller 25 and again switched to the first circuit 3171 connected with the first data register 271. The next first data block (N data block) is stored into the first data register 271.

Step 307: Whether the data stored in the second data register 272 is completely stored in the memory array 292. The steps 304 to 307 are repeatedly executed until all data are stored into the memory array.

Figure 4:
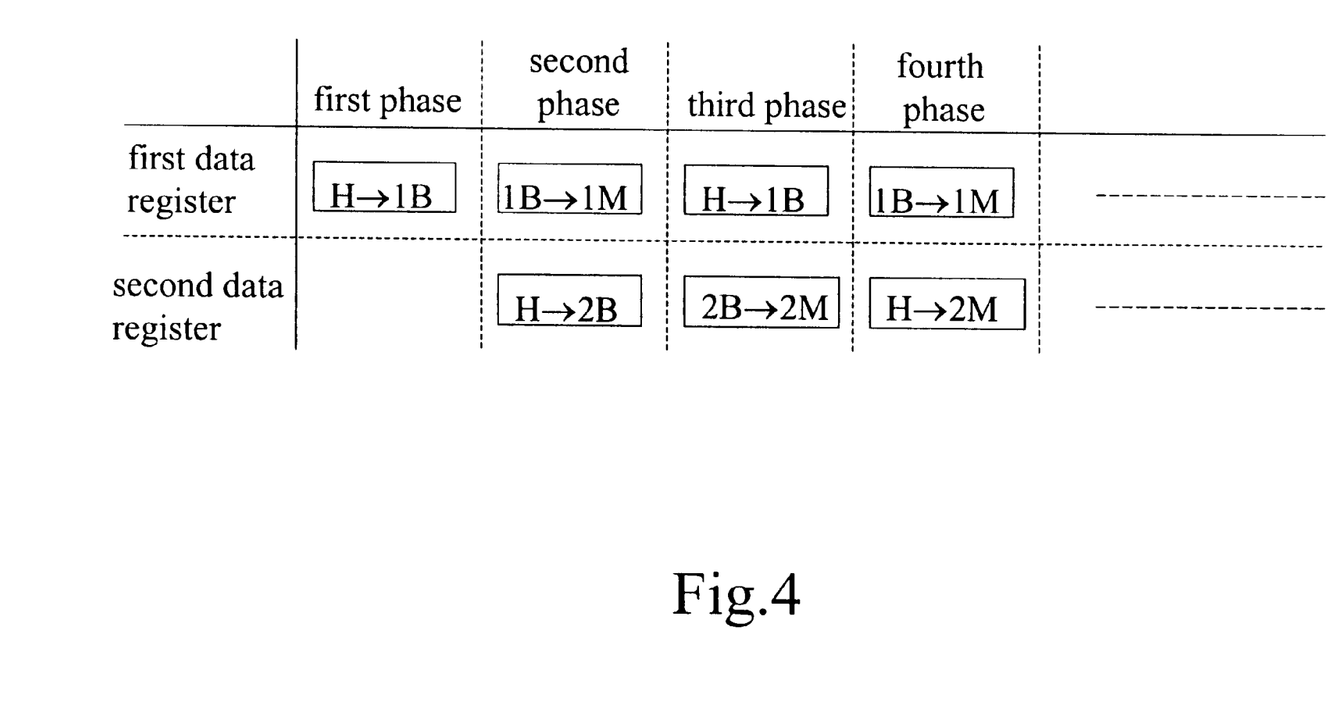
FIG. 4 shows the timing diagram of the preferred embodiment in FIG. 2.

FIG. 4 shows the timing diagram of this embodiment. The table contents in row direction represent the data register and the table contents in column direction represent processing period.

In first phase, the main frame 20 sends the first data block to the first data register 271, and the operation is symbolized by H→1B. At this time, the second data register 272 is idle.

In second phase, the first data block is moved from the first data register 271 to the memory array 291 and the operation is symbolized by 1B→1M. At this time, the main frame 20 sends the second data block to the second data register 272, and the operation is symbolized by H→2B.

In third phase, the second data block is moved from the second data register 272 to the second memory array 292, and this operation is symbolized by 2B→2M. At this time, the main frame 20 sends the next first data block to the first data register 271, and the operation is symbolized by H→1B.

In fourth phase, the first data block is moved from the first data register 271 to the first memory array 291 and the operation is symbolized by 1B→1M. At this time, the main frame 20 sends the second data block to the second data register 272, and the operation is symbolized by H→2B. The operation in this phase is similar to the operation in the second phase. In other word, the operations in the second and third phases are alternatively executed until all data are stored.

As can be seen from FIG. 4, the main frame 20 has no idle time in all phase of operation; the efficiency thereof can be fully exploited.

FIG. 5 shows the flowchart of reading operation.

Step 501: the main frame 20 informs the micro-controller 25 of reading operation from the first memory array 291 and the second memory array 292.

Step 502: The first data block is moved from the first memory array 291 to the first data register 271.

Step 503: The bus switch 31 of the register administrator 30 is controlled by the micro-controller 25 and selectively switched to a first circuit 3171 connected with the first data register 271.

Step 513: Simultaneously with the step 503, the second data block is moved from the second memory array 292 to the second data register 272. Afterward, a step 505 is executed.

Step 504: The main frame 20 reads the first data block stored in the first data register 271 through the first circuit 3171.

Step 505: Waiting and detecting whether the second data block is completely stored in the second data register 272.

Step 506: The bus switch 31 of the register administrator 30 is controlled by the micro-controller 25 and selectively switched to a second circuit 3172 connected with the second data register 272.

Step 517: Simultaneously with the step 507, the next first data block is moved from the first memory array 291 to the first data register 271.

Step 508: Waiting and detecting whether the next first data block is completely stored in the first data register 271. Afterward, steps 503 to 508 are repeatedly executed until all data are read by the main frame 20.

Figure 6:
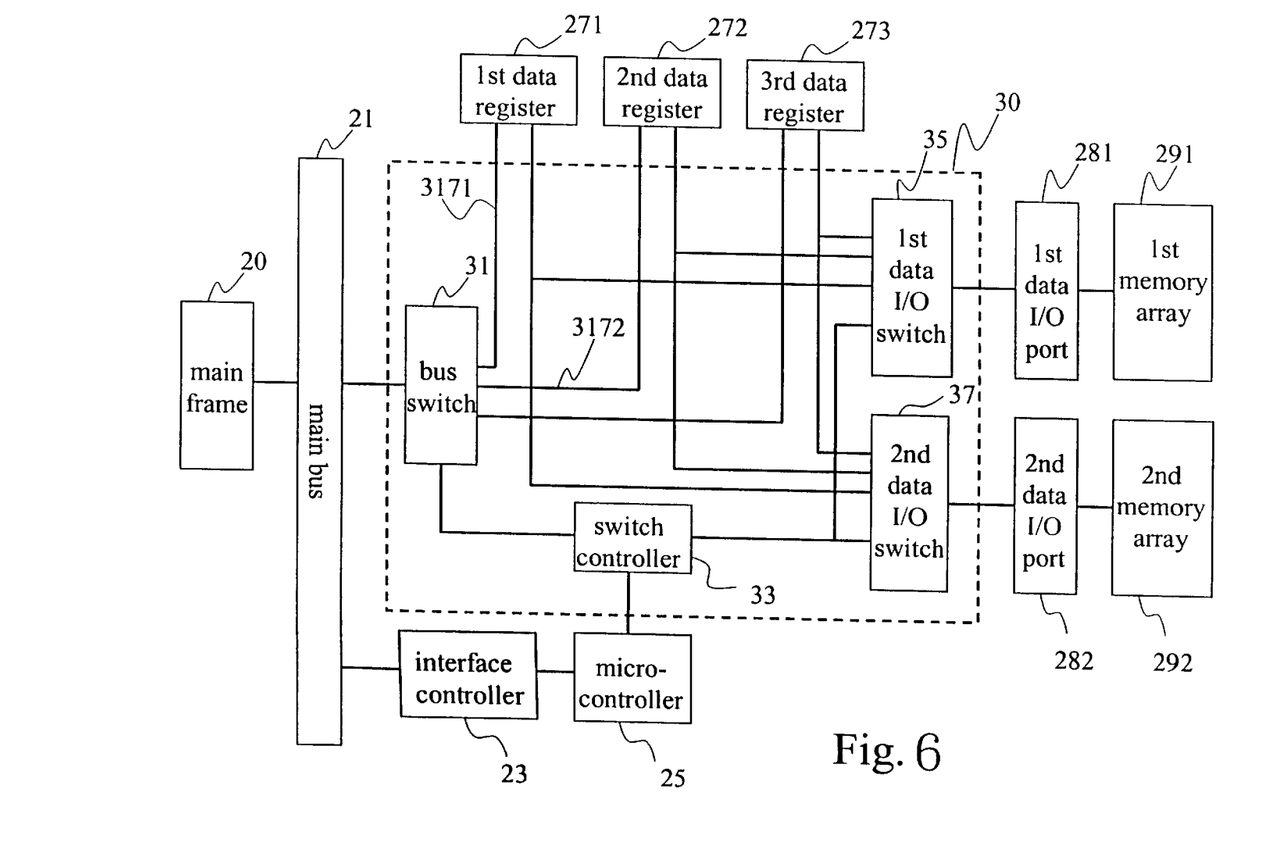
FIG. 6 shows the block diagram of another preferred embodiment of the present invention.

FIG. 6 shows the block diagram of another preferred embodiment of the present invention. The first preferred embodiment of the present invention is exemplified with two data registers 271 and 272, and two memory arrays 29 1and 292. However, the number of the data registers is not necessarily matched with the number of the memory arrays. In the second preferred embodiment of the present invention, the memory array apparatus has three data registers 271, 272 and 273, which are used with two I/O ports 281 and 282 and two memory arrays 291 and 292. To schedule the data blocks in the three data registers 271, 272 and 273, the register administrator 30 has a first I/O switch 35 and a second I/O switch 37. The first I/O switch 35 is connected to the three data registers 271, 272 and 273, and the first I/O port 281. The second I/O switch 37 is connected to the three data registers 271, 272 and 273, and the second I/O port 282. The first I/O switch 35 and the second I/O switch 37 are controlled by a switch controller 33 connected to an interface controller 25. The register administrator 30 further has a bus switch 31 to schedule data transmission path with the first I/O switch 35 and the second I/O switch 37.

Figure 7:
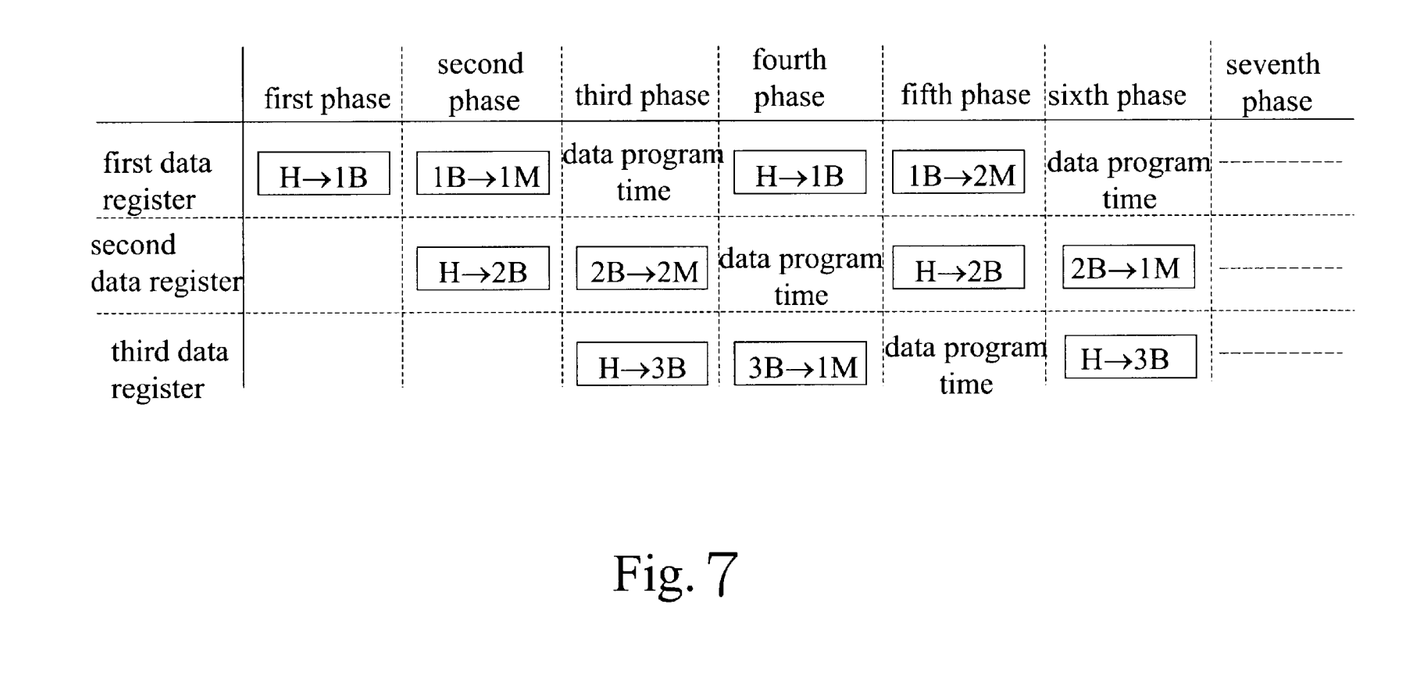
FIG. 7 shows the timing diagram of the preferred embodiment in FIG. 6.

FIG. 7 shows the timing diagram of this embodiment. The table contents in row direction represent the data register and the table contents in column direction represent processing phase.

In a first phase, the main frame 20 sends the first data block to the first data register 271, and the operation is symbolized by H→1B. At this time, the second data register 272 and the third data register 273 are idle.

In a second phase, the first data block is moved from the first data register 271 to the memory array 291 and the operation is symbolized by 1B→1M. At this time, the main frame 20 sends the second data block to the second data register 272, and the operation is symbolized by H→2B. At this time, the third data register 273 is still idle.

In a third phase, the second data block is moved from the second data register 272 to the second memory array 292, and this operation is symbolized by 2B→2M. At this time, the main frame 20 sends the third data block to the third data register 273, and the operation is symbolized by H→3B. At this time, the first data register 271 is idle and this time can be used as writing time of the first memory array 291.

In a fourth phase, the first data block is moved from the third data register 273 to the memory array 291 and the operation is symbolized by 3B→1M. At this time, the main frame 20 sends the first data block to the first data register 271, and the operation is symbolized by H→1B. At this time, the second data register 272 is idle and this time can be used as writing time of the second memory array 292.

In a fifth phase, the first data block is moved from the first data register 271 to the second memory array 292 and the operation is symbolized by 1B→2M. At this time, the main frame 20 sends the second data block to the second data register 272, and the operation is symbolized by H→2B. At this time, the third data register 273 is idle and this time can be used as writing time of the first memory array 291. For the main frame 20 and all data registers, the operations thereof are similar to those in the second phase.

In a sixth phase, the operation in this phase is similar to the operation in the third phase. In other word, the operations in the second to fourth phases are sequentially executed until all data are stored.

As can be seen from FIG. 7, the main frame 20 has no idle time in all phase of operation even though certain data register is idle in that phase; the efficiency thereof can be fully exploited.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A memory array apparatus with shorter data accessing time, comprising:
   a plurality of memory arrays;
   an interface controller connected to a main frame through a main bus;
   a micro-controller coupled by an input thereof to said interface controller;
   a plurality of data registers used to temporarily store data to be accessed;
   a register administrator including at least one bus switch connected to the main frame though the main bus and connected to the micro-controller, said at least one bus switch being controlled by the micro-controller to selectively communicate with each of said plurality of data registers; and
   a plurality of data I/O ports, each data I/O port being connected to all of said plurality of data registers and a respective one of said plurality of arrays, each of said plurality of data registers being connected to all of said plurality of the data I/O ports.

2. The memory array apparatus with shorter data accessing time as in claim 1, further comprising at least one I/O switch connected to all of said plurality of the data registers and a respective one of said plurality of the I/O ports said at least one I/O switch being controlled by the micro-controller to selectively communicate with each of said plurality of the data registers.

3. The memory array apparatus with shorter data accessing time as in claim 2, further comprising a switch controller connected to the micro-controller, the bus switch and said at least one I/O switch.

4. The memory array apparatus with shorter data accessing time as in claim 1, wherein the number of the data registers in said plurality thereof is not less than that of the memory arrays.

5. A method of storing data using the memory array apparatus comprising:
   a plurality of memory arrays;
   an interface controller connected to a main frame though a main bus and connected to a micro-controller;
   a plurality of data registers used to temporarily store data to be accessed;
   a register administrator having at least one bus switch connected to the main frame through the main bus and connected to the micro-controller, said at least one bus switch being controlled by the micro-controller to selectively communicate with each of said plurality of data registers;
   a plurality of circuits, each coupled between said at least one bus switch and a respective one of the plurality of data registers; and
   at least one data I/O port, said data I/O port being connected to all said data registers and to a respective one of said plurality of memory arrays, the method comprising the steps of:
   a. controlling said at least one bus switch of the register administrator by the micro-controller and selectively switching said bus switch to a first circuit of said plurality of circuits connected with a first data register of said plurality of data registers;
   b. storing a first data block of the data to be accessed in said first data register;
   c. moving the first data block to a first memory array of said plurality of memory arrays through said at least one data I/O port, simultaneously switching selectively the bus switch of the register administrator to a second circuit of said plurality of circuits connected with a second data register of said plurality of data registers, and storing a second data block of the data to be accessed in said second data register;
   d. detecting whether the data stored in said first data register is completely stored in said first memory array;
   e. moving the second data block to a second memory array of said plurality of the memory arrays through said at least one data I/O port, simultaneously switching selectively the bus switch of the register administrator to the first circuit, and storing a next first data block of the data to be accessed in the first data register;
   f. detecting whether the data stored in the second data register is completely stored in the second memory array; and
   g. repeating said steps (c) to (f) until all data to be accessed are stored in the memory array apparatus.

6. The storing method as in claim 5, wherein the first data block is stored in the first memory array and the second data block is stored in the second memory array.

7. A reading method to read data using the memory array apparatus comprising
   a plurality of memory arrays;
   an interface controller connected to a main frame through a main bus and connected to a micro-controller;
   a plurality of data registers used to temporarily store data to be accessed;
   a register administrator having at least one bus switch connected to the main frame through the main bus and connected to the micro-controller, said at least one bus switch being controlled by the micro-controller to selectively communicate with each of said plurality of data registers;
   a plurality of circuits, each coupled between said at least one bus switch and a respective one of the plurality of data registers; and
   at least one data I/O port, said data I/O port being connected to all said data registers and to a respective one of said plurality of memory arrays, the method comprising the steps of:
   a. moving a first data block of the data to be read from a first of said plurality of the memory arrays to a first data register of said plurality of the data registers;
   b. controlling said at least one bus switch of the register administrator by the micro-controller and selectively switching said at least one bus switch to a first circuit of said plurality of circuits connected with the first data register; and simultaneously moving a second data block of the data to be read from a second of said plurality of the memory arrays to a second data register of said plurality of the data registers;

c. reading by the main frame the first data block stored in the first data register through the first circuit;

d. detecting whether the second data block is completely stored in the second data register;

e. controlling said at least one bus switch of the register administrator by the micro-controller and selectively switching said at least one switch to a second circuit of said plurality of circuits connected with the second data register;

f. reading by the main frame the second data block stored in the second data register through the first circuit; and simultaneously moving a next first data block of the data to be read from the first memory array to the first data register;

g. detecting whether the next first data block is completely stored in the first data register; and h. repeating said steps (b) to (g) until all data to be read are accessed by the main frame.

* * * * *